United States Patent [19]

Fukuda

[11] Patent Number: 5,472,232
[45] Date of Patent: Dec. 5, 1995

[54] AIR BAG SYSTEM FOR SAVING LIFE IN A CRASH

[75] Inventor: Kazuyuki Fukuda, Joyo, Japan

[73] Assignee: Rohm Co. Ltd., Kyoto, Japan

[21] Appl. No.: 158,274

[22] Filed: Nov. 29, 1993

[30]    Foreign Application Priority Data

Nov. 30, 1992 [JP] Japan ................................ 4-319584

[51] Int. Cl.⁶ .................................................. B60R 21/16
[52] U.S. Cl. ........................... 280/735; 330/282; 340/436
[58] Field of Search ............................. 280/735, 728 R; 330/282, 286; 307/10.1; 340/436, 438

[56]               References Cited

U.S. PATENT DOCUMENTS

| 5,068,793 | 11/1991 | Condne et al. ................... | 280/735 |
| 5,181,011 | 1/1993 | Okano .............................. | 340/436 |

FOREIGN PATENT DOCUMENTS

| 58-200611 | 11/1983 | Japan ................................. | 330/282 |
| 59-37716 | 3/1984 | Japan ................................. | 330/282 |
| 1-181208 | 7/1989 | Japan ................................. | 330/282 |
| 2-95005 | 4/1990 | Japan ................................. | 330/282 |
| 4-191142 | 7/1992 | Japan ................................. | 280/735 |
| 4-353052 | 12/1992 | Japan ................................. | 280/735 |

OTHER PUBLICATIONS

IBM Technical Disclosure Bulletin vol. 16, No. 11, Apr. 1974 "Digitally Controlled Amplifier Circuits".

*Primary Examiner*—Karin L. Tyson
*Attorney, Agent, or Firm*—Nikaido Marmelstein Murray & Oram

[57]                    ABSTRACT

An air bag system is provided with a gain variable amplifier which corrects an output from an acceleration sensor by amplifying it with a set gain and a microcomputer which controls a gain of the gain variable amplifier so that a desired output is obtained when a predetermined input is supplied to the sensor and stops the gain control under a mounted condition after the gain has been set. For the gain control by the microcomputer, a shift register is used.

5 Claims, 3 Drawing Sheets

AIR BAG SYSTEM FOR SAVING LIFE IN A CRASH

BACKGROUND OF THE INVENTION

1. Field of the Invention

The present invention relates to an air bag system for saving life in a crash of a vehicle such as a car.

2. Description of the Prior Art

Cars are provided with an air bag system which senses the acceleration at the time of a head-on clash by means of an acceleration sensor and when the acceleration is high, instantaneously swells an air bag 6 provided at the driver's seat side as shown in FIG. 2 in order to prevent a driver 30 from smashing against a steering wheel 31 or the windshield.

Conventionally, air bag systems are provided with a correcting circuit for correcting nonuniformity of a characteristic of the acceleration sensor. An air bag system with the correcting circuit is as shown in FIG. 1.

In FIG. 1, the reference numeral 1 represents an acceleration sensor which senses the acceleration of the car, and the reference numeral 2 represents an amplifier which amplifies an output from the acceleration sensor 1 with a fixed gain. The reference numeral 3 represents a correcting microcomputer which, in the case where an output obtained when an input of a predetermined value is provided to the acceleration sensor 1 is not a predetermined value, corrects nonuniformity of a characteristic of the acceleration sensor 1 so that a predetermined output is obtained. The microcomputer 3 has an internal memory which stores the characteristic of the acceleration sensor 1 which have been measured in advance, and performs correction by adding to the output of the acceleration sensor 1 a correction value calculated in accordance with the characteristic of the acceleration sensor 1 under a condition where the system is mounted on a car.

The reference numeral 4 represents a system microcomputer which monitors the acceleration condition of the car based on the output corrected at the microcomputer 3 and determines whether to open and swell an air bag 6 or not at the time of a crash through a synthetic judgement based on the acceleration condition and other factors. The reference numeral 5 represents a driving portion controlled by the system microcomputer 4 so as to open and swell the air bag 6.

In the conventional correcting circuit of the above-described arrangement, however, since to perform the correction, it is necessary to obtain the correction value which is in accordance with the characteristic of the acceleration sensor through complicated calculations by the correcting microcomputer under a condition where the system is mounted on a car, the processing speed is low. This is undesirable for use in the air bag system, since 0.5 seconds, which is shorter than a blink of an eye, is necessary for the air bag 6 to swell after a crash. Further, since it is necessary to use a microcomputer having a calculation function as the correcting microcomputer, the cost increases.

SUMMARY OF THE INVENTION

An object of the present invention is to provide an air bag system provided with a low-cost correcting circuit having a high processing speed and correcting nonuniformity of the acceleration sensor.

An air bag system of the present invention is provided with an acceleration sensor, an amplifier of gain variable type amplifying an output from the acceleration sensor, storing means for storing as a gain signal a gain obtained when a desired output is obtained from the amplifier in response to a predetermined input supplied to the acceleration sensor, means for providing the amplifier with the gain signal stored in the storing means, an air bag driving circuit which is activated in accordance with an output from the amplifier, and an air bag driven by the air bag driving circuit.

According to such a feature, since the output correction of the acceleration sensor in an air bag system under a condition where the air bag system is mounted on a car is performed only by the gain variable amplifier whose gain has been set, the processing speed is higher.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
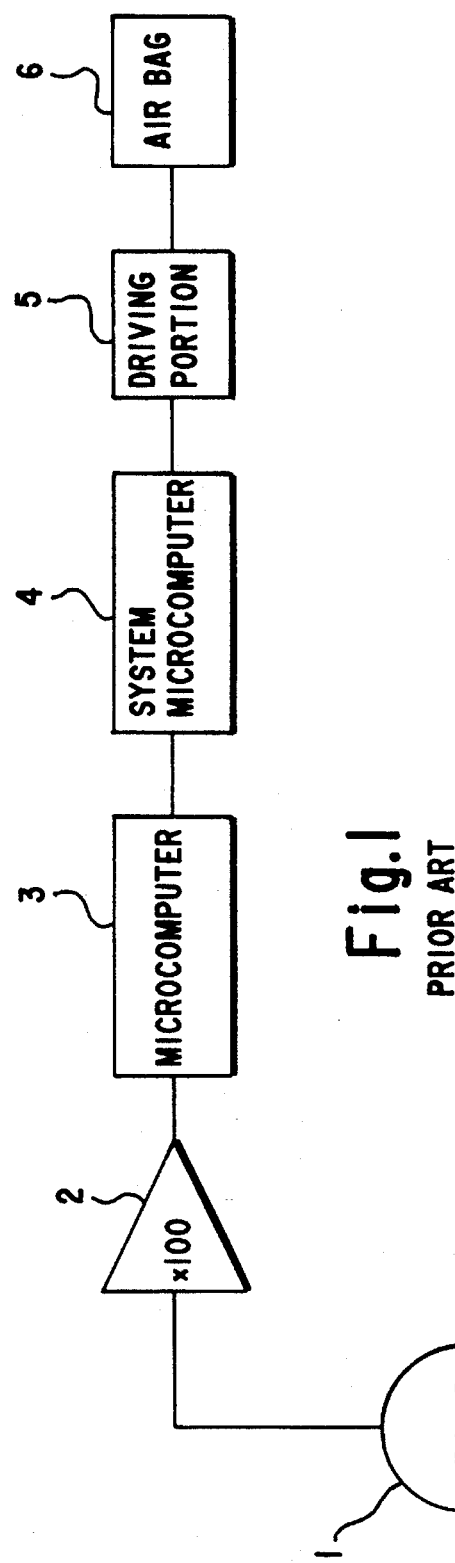
FIG. 1 is a block circuit diagram showing a conventional air bag system.
Figure 2:
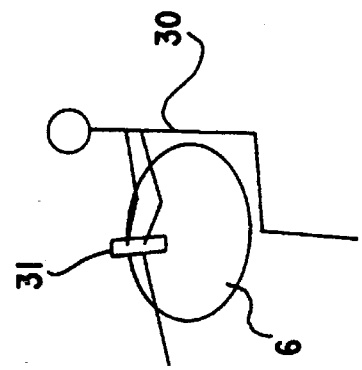
FIG. 2 is a schematic view showing a condition where an air bag system is used.

An embodiment of the present invention will hereinafter be described with reference to the drawings. The same components as those of the prior art of FIG. 1 are designated by the same reference numerals.

Figure 3:
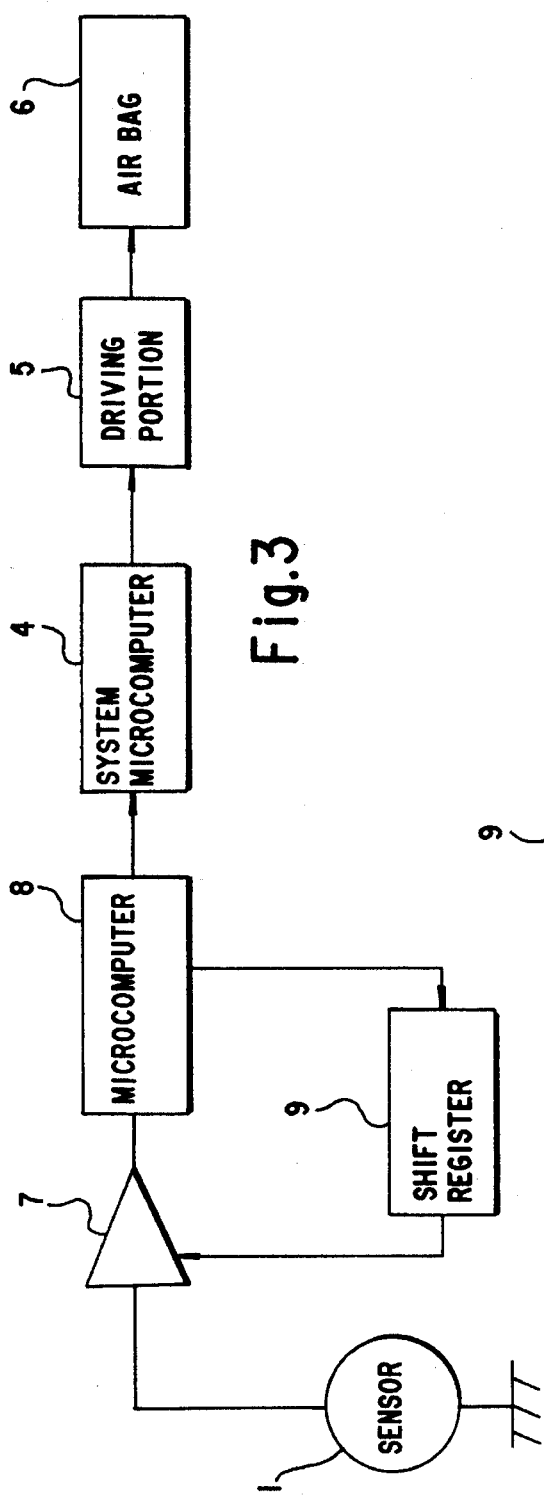
FIG. 3 is a block circuit diagram showing an air bag system of the present invention.

In this embodiment, the amplifier 2 and the correcting microcomputer 3 shown in FIG. 1 are respectively replaced by a gain variable amplifier 7 which, as shown in FIG. 3, corrects an output from the acceleration sensor 1 by amplifying it with a set gain and a correcting microcomputer 8 which controls the gain of the gain variable amplifier 7 so that a desired output is obtained when a predetermined input is provided to the acceleration sensor 1. Under the mounted condition after the gain has been set, the microcomputer 8 stops the gain control. The gain control by the microcomputer 8 is performed in the following manner: a gain controlling signal from the microcomputer 8 is transmitted to a shift register 9, and based on an output from the shift register 9 generated in accordance with the gain controlling signal, the gain of the gain variable amplifier 7 is set. The microcomputer 8 has a gain setting mode and a mounted mode. The mounted mode is a mode used under a condition where the air bag system is mounted on a car. The gain setting mode is a mode for controlling the gain of the gain variable amplifier 7.

Thus, in an air bag system according to this embodiment, the gain of the gain variable amplifier 7 is set before the air bag system is mounted on a car. Specifically, an output of the acceleration sensor 1 when a predetermined input is provided thereto is amplified with a presently-set gain by the gain variable amplifier 7, and the amplified output is transmitted to the microcomputer 8. The microcomputer 8 determines how much is the difference between a reference value and the output of the acceleration sensor 1 transmitted from the gain variable amplifier, and transmits the gain controlling signal to the shift register 9 in order to perform gain control in accordance with the difference. Then, based on an output from the shift register 9 generated in accordance with the controlling signal, the gain of the gain variable amplifier 7 is set so that a desired output is obtained when a predetermined input is provided to the acceleration sensor 1.

As a result, the correction of the output of the acceleration sensor 1 is performed only by the gain variable amplifier 7 under the mounted condition after the gain has been set, and the output from the gain variable amplifier 7 is provided straight to the system microcomputer 4 without stopping at the microcomputer 8.

In an actual air bag system, an acceleration sensor at each front side of the car, and the above-described correcting circuit is provided for each sensor. The correction output from each correcting circuit is transmitted to the system microcomputer.

Figure 4:
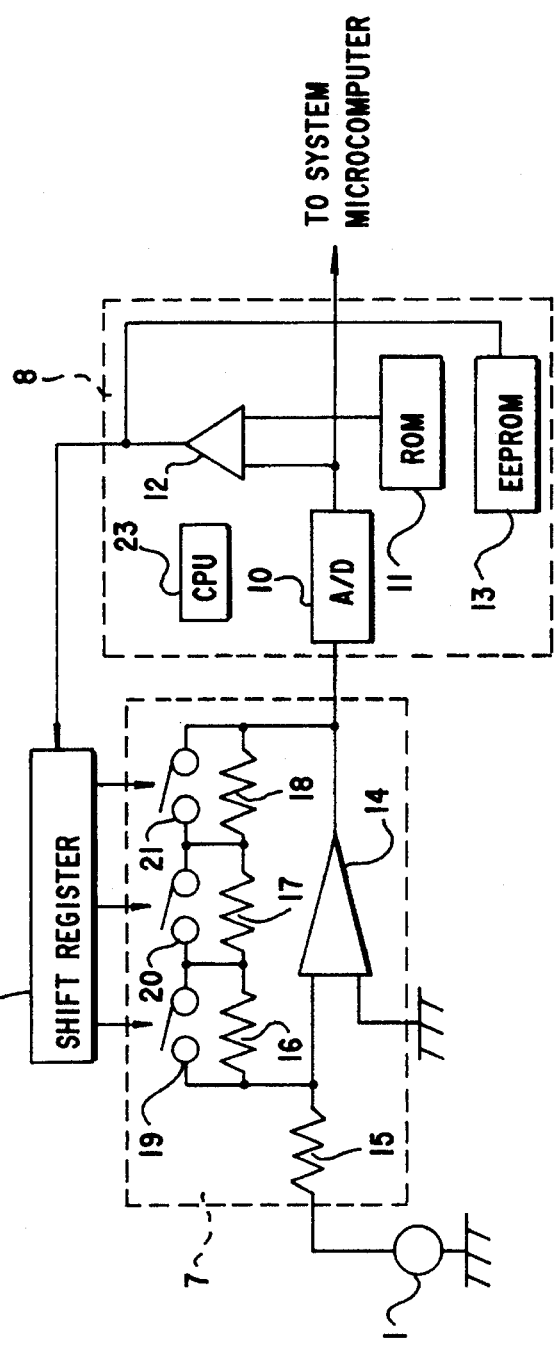
FIG. 4 shows an example of an arrangement of a circuit for correcting nonuniformity of the acceleration sensor provided in the air bag system.

FIG. 4 shows an example of a gain controlling arrangement comprising the microcomputer 8 and the shift register 9 (in this case, 3-bit shift register). The microcomputer 8 includes an analog to digital (A/D) converter 10 which converts the output from the gain variable amplifier 7 into a digital value, a read only memory (ROM) 11 which stores the reference value for controlling the gain so that a desired output is obtained when a predetermined input is provided to the acceleration sensor 1, a comparator 12 which compares the output from the gain variable amplifier 7 A/D-converted by the A/D converter 10 with the reference value stored in the ROM 11 to output to the shift register 9 a gain controlling signal which decreases the gain of the gain variable amplifier 7 when the output is larger than the reference value and a gain controlling signal which increases the gain when the output is smaller, and an electrically erasable programmable read only memory (EEPROM) 13 which stores a gain controlling signal provided to the shift register 9 that causes the comparison result to substantially equal the reference value.

The A/D converter 10, the comparator 12, the ROM 11 and the EEPROM 13 are controlled by a central processing unit (CPU) 23 with no calculation function, provided in the microcomputer 8. The CPU 23 stops the gain control by the comparator 12, etc. and causes the shift register 9 to perform the gain setting based on the output from the EEPROM 13 under the mounted condition after the gain has been set.

The gain variable amplifier 7 includes an operational amplifier 14, its input resistor 15 (resistance value is R) and first, second and third feedback resistors 16, 17 and 18 (resistance values are R, 2R and 4R, respectively), a first electrical switch 19 which is turned off when the output from the first bit of the shift register 9 is "1", a second electrical switch 20 which is turned off when the output from the second bit of the shift register 9 is "1", a third electrical switch 21 which is turned off when the output of the third bit of the shift register 9 is "1". That is, when the first and third bits of the shift register 9 whose 3-bit output varies in eight ways are "1" and the second bit thereof is "0", the first and third feedback resistors 16 and 18 are cascaded and the feedback resistance thereof is 5R.

With this arrangement, the gain control by comparison with the reference value is performed by the microcomputer 8 at the time of the gain setting performed before the system is mounted, and under the mounted condition after the gain has been set, the gain control is stopped and the output from the A/D converter 10 is directly outputted to the system microcomputer 4.

Figure 5:
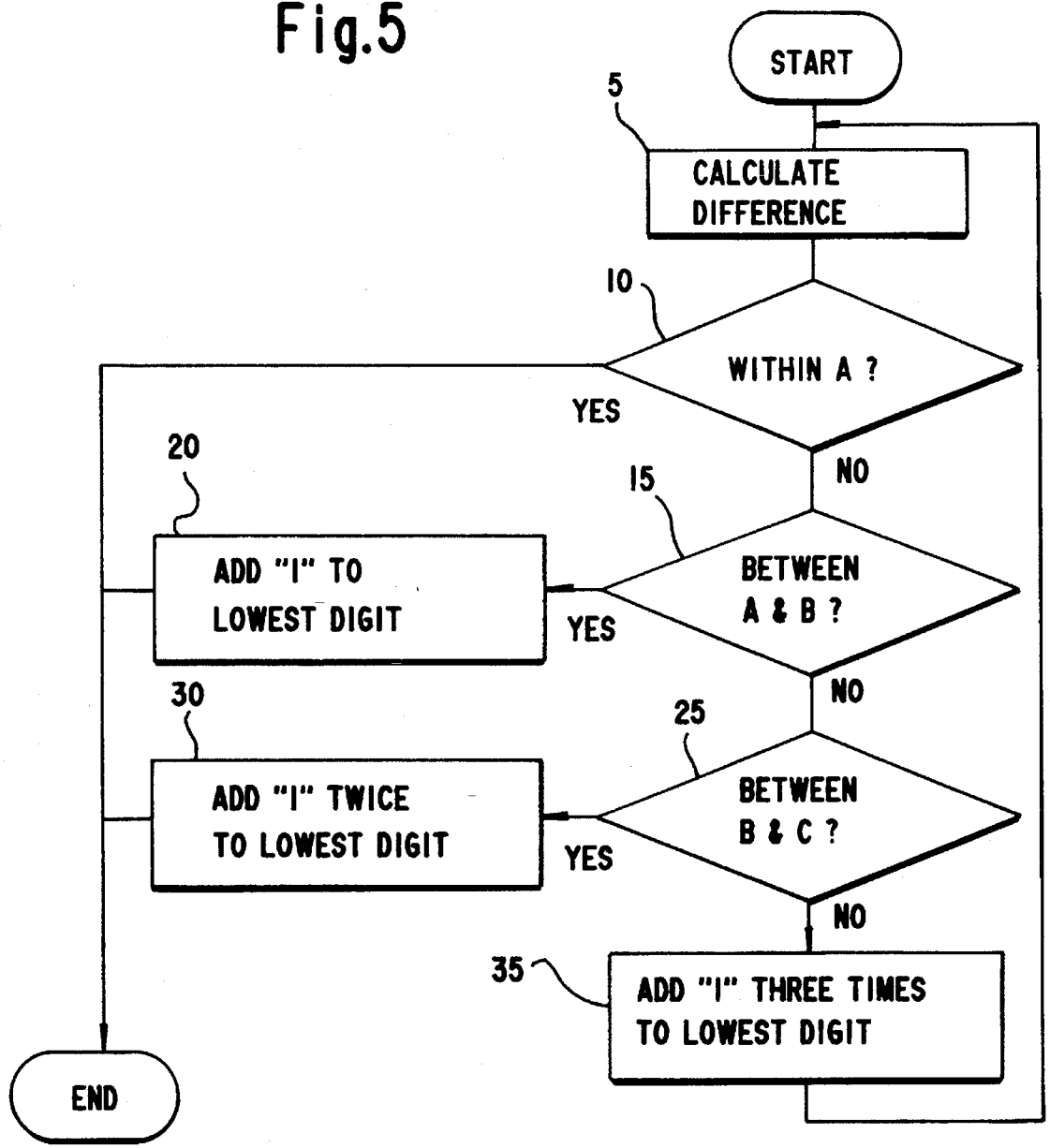
FIG. 5 is a flowchart of an example of a control operation performed by a microcomputer provided in the air bag system.

Instead of by the above-described comparison with the reference value, the gain control may be performed by obtaining the difference from the reference value and outputting a gain controlling signal in accordance with the difference. FIG. 5 is a flowchart of an example of a control operation of a correcting microcomputer of such an arrangement when the output from the gain variable amplifier 7 is smaller than the reference value. First, at step #5, the difference from the reference value is calculated. Then, at step #10, whether the difference is within a permissible value A or not is determined.

When it is not within the permissible value A, the process proceeds to step #15, where whether or not it is between the permissible value A and a value B which is larger than A is determined. When it is between them, the process proceeds to step #20, where "1" is added to the lowest digit of the presently-outputted 3-bit gain controlling signal. Then, the control operation is completed.

When the difference is not between A and B, at step #25, whether or not it is between B and a value C which is larger than B is determined. When it is between them, at step #30, "1" is added twice to the lowest digit of the presently-outputted 3-bit gain controlling signal. Then, the control operation is completed. When the difference is not between them, the process proceeds to step #35, where "1" is added three times to the lowest digit of the presently-outputted 3-bit gain controlling signal. Then, the process returns to the first step #5.

While in this embodiment, three feedback resistors having different resistance values are activated and disabled by using a 3-bit shift register, the present invention is not limited thereto. Moreover, while the gain is set by providing a predetermined input to the acceleration sensor 1, the gain may be set, without the predetermined input being provided to the acceleration sensor, based on an output from an EEPROM storing the characteristic of the acceleration sensor which has been measured in advance.

As described above, according to the present invention, since under a condition where the air bag system is mounted on a car, the gain control by the microcomputer is stopped and the correction of the output of the sensor is performed only by the gain variable amplifier, the processing speed is high compared to the conventional arrangement where the correction of the output of the sensor under the mounted condition is performed through complicated calculation by a microcomputer. Further, since the gain control by the microcomputer is performed by the comparison with the reference value, a microcomputer having no calculation function may be employed. As a result, the cost is reduced. The air bag system of the present invention may be used not only in an automobile such as a car but also in a boat such as a motorboat.

Obviously, many modifications and variations of the present invention are possible in light of the above teachings. It is therefore to be understood that within the scope of the appended claims, the invention may be practiced other than as specifically described.

What is claimed is:

1. An air bag system for use in a vehicle, comprising:

an acceleration sensor;

an amplifier of gain variable type which amplifies an output from the acceleration sensor;

storing means for storing as a gain signal a gain obtained when a desired output is obtained from the amplifier in response to a predetermined input supplied to the acceleration sensor;

means for providing the amplifier with the gain signal stored in the storing means;

an air bag driving circuit which is activated in accordance with an output from the amplifier;

an air bag driven by the air bag driving circuit; and wherein the gain signal stored in the storing means is a gain obtained when the output from the amplifier coincides with a predetermined reference value.

2. An air bag system according to claim 1, wherein said amplifier is constituted by an operational amplifier having a feedback resistor, and a value of the feedback resistor depends on the gain signal from the storing means.

3. An air bag system according to claim 2, wherein said feedback resistor includes a plurality of resistors connected in series, a plurality of switches are provided in parallel with the resistors, respectively, and ON/OFF condition of the switches depends on the gain signal from the storing means.

4. An air bag system according to claim 3, wherein a shift register which supplies each switch with an ON/OFF signal is provided, and the shift register operates in response to the gain signal from the storing means.

5. An air bag system for use in a vehicle, comprising:

an acceleration sensor;

an amplifier of gain variable type which amplifies an output from the acceleration sensor;

controlling means which has a gain setting mode and a mounted mode, said controlling means controlling a gain of the amplifier so as to substantially coincide with a reference value in the gain setting mode;

storing means for storing as a gain signal a gain obtained when an output from the amplifier substantially coincides with the reference value, said storing means providing the amplifier with the gain signal in the mounted mode of the controlling means;

an air bag driving circuit which is activated in accordance with the output from the amplifier; and an air bag driven by the air bag driving circuit.

\* \* \* \* \*